Feb. 2, 1965  E. J. WATZL ETAL  3,167,826
SPRING AND ATTACHING DEVICE FOR SEALER STRIP
Filed Nov. 26, 1962
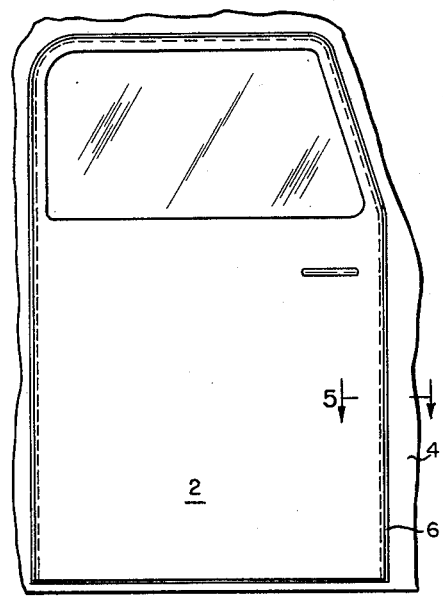
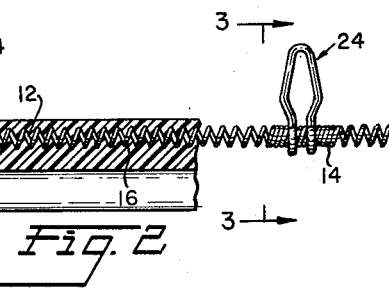
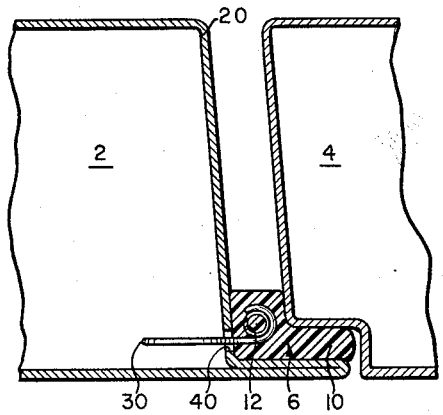
INVENTORS
ERNEST J. WATZL
EDWARD L. ZUROWESTE
THOMAS W. CAMPBELL
GEORGE W. TOMASHOT
BY Scrivener & Parker
ATTORNEYS

United States Patent Office 3,167,826
Patented Feb. 2, 1965

3,167,826
SPRING AND ATTACHING DEVICE FOR SEALER STRIP
Ernest J. Watzl and Thomas W. Campbell, Dayton, Edward L. Zuroweste, Waynesville, and George W. Tomashot, Dayton, Ohio, assignors to Associated Spring Corporation, Bristol, Conn., a corporation of Delaware
Filed Nov. 26, 1962, Ser. No. 240,064
2 Claims. (Cl. 20—69)

This invention relates to seals which are interposed between two relatively movable members and, more particularly, to elongated, resilient sealer strips which are attached either to a door or to its frame and which are constructed and intended to act as a seal or cushion between them.

Such sealer strips are well known and in many of them a helical spring is embedded in the elongated resilient member. It is important in such sealer strips that there be a secure connection between the strip and the means for attaching the strip to the part on which it is supported. Further, it is also important that the sealer strip be readily and easily extensible, and that any part embedded in the strip have no adverse effect on the extensibility of the strip. In this connection, it is important to note that the holes in the door or door frame of an automobile may be unevenly spaced because of variations produced in manufacture, whereas the attaching devices forming the part of a sealer strip are usually evenly spaced, thus causing difficulty in matching them to the holes in which they are inserted.

With these considerations in mind, it has been the principal object of the invention to provide a sealer strip of new and improved construction and utility, and a device which is embedded in a sealer strip and which is so constructed that a secure and practical means is provided for connecting to the strip the devices which attach the strip to the structure which supports it, to provide such an embedded device which has no adverse effect on the extensibility of the strip, and to provide a strip which is so constructed that it will easily accommodate the spaced attaching members to the holes in the supporting structure.

Description of the drawings

FIG. 1 is an elevational view showing a door and its frame and a sealing strip according to the invention interposed between them;

FIG. 2 is a side view, partly in elevation and partly in section, showing the sealing strip provided by the invention;

FIG. 3 is an enlarged view taken on line 3—3 of FIG. 2;

FIG. 4 is a side elevational view of the parts shown in FIG. 3, and

FIG. 5 is a sectional view taken on line 5—5 of FIG. 1.

In FIGS. 1 and 5 of the drawings there is shown a door 2, which may be a vehicle door, and a part of the frame 4 which surrounds the door. In accordance with known practice a sealing strip 6 is interposed between the periphery of the door and that of the frame and serves to seal the opening between them and to cushion the impact of the door on the frame when the door is closed, and which may be attached either to the door or the frame, being attached to the door 2 in the embodiment of the invention described in this specification.

In accordance with the invention the sealer strip 6 has a new and improved construction and new and improved means for attaching it to the door or frame. This sealer strip is particularly disclosed in FIG. 2 and comprises an elongated strip 10 of rubber or other resilient material having any desired and suitable cross sectional shape. An elongated helical spring 12 is entirely embedded in this resilient strip and extends substantially from end to end thereof. In accordance with the invention, this spring has spaced sections 14 of its length formed of abutting or substantially abutting coils. These sections are spaced along the length of the spring and are separated by spaced sections 16 of the spring in which the convolutions are spaced apart. Each of the sections 14 in which the convolutions are substantially abutting constitutes an area of substantially continuous exterior surface which provides a supporting surface for the means for attaching the sealer strip to the door or frame. Between adjacent supporting areas 14 the convolutions of the spring are relatively widely spaced, thus providing sections 16 of relatively great flexibility permitting easy stretching of the helix.

Means are provided by the invention for attaching the elongated resilient strip 6 with its embedded spring to a part of the door or frame, such as the edge panel 20 of the door, as shown in FIGS. 2 and 5. These means comprise a plurality of attaching members 24 each of which is formed of wire and is bent to provide a part positioned outside the rubber strip and extending outwardly therefrom and another part which is securely attached to the spring member 12 which is embedded in the rubber strip. Each attaching member is formed from a single piece of wire bent to hairpin shape and having its free end parts bent to form parallel C-shaped parts lying in planes at right angles to the general plane of the hairpin shaped attaching member. As shown in FIGS. 3 and 4, these C-shaped end parts partially but securely surround the spring member within the resilient strip and connect each attaching member to the spring. Each attaching member has an external part 28 which is generally diamond shaped, having a rounded entering end 30 from which the wire diverges and then converges to form shoulders 32, which are spaced apart a distance greater than the diameter of the hole 40 into which the external part 28 is pressed. In the preferred embodiment of the invention each attaching member 24 is connected to one of the parts 14 of the embedded spring at which the spring convolutions substantially abut each other, and no attaching member is connected to the spring at a part thereof at which the convolutions are spaced apart. In a preferred embodiment of the invention the adjacent attaching members 24 are spaced apart along the length of the spring by a distance less than the distance between the holes 40 in the supporting member, for a reason which will be explained.

The invention thus provides a resilient rubber strip having any desired cross sectional shape, and an elongated helical spring embedded in the resilient strip and having alternate sections spaced along its length in which the convolutions are closely wound and are spaced apart. With this spring there is associated a plurality of attaching members, each having C-shaped end parts surrounding one of the closely wound sections of the embedded helical spring and also having a diamond shaped part protruding from the resilient strip which may be pressed through a hole in a door or door frame and the widest part of which is wider then the diameter of the hole through which it is to be pressed. Thus, when the clip is so pressed it contracts laterally and then expands in order to provide a tight but releasable attachment within the hole in the door or frame member. Adjacent attaching members are spaced apart along the length of the spring by a distance less than that between adjacent holes in the door or frame so that the strip must be slightly stretched to permit the attaching members to be inserted in the holes, thus insuring that the attaching members will be accommodated to the holes regardless of differences in the spacing between adjacent holes.

The alternate sections of continuous external surface 14 and high flexibility 16 which are spaced along the length of the helical wire member which is embedded in the sealer strip co-operate with the attaching members 24 and with the holes in the door or frame member to provide improved attachment. It is not practical to mount a wire member in surrounding relation on an open wound helix and maintain any sort of dimensional stability, but by providing the spaced areas of closely wound convolutions the invention provides spaced platforms along the length of the helix on which the attaching devices 24 may be mounted with the maintenance of stability.

It will be apparent that as the external part of each attaching device 24 is pushed into a hole in the door or frame the legs of the attaching device will move toward and then away from each other, and that this leg movement is easily accommodated by the generally continuous surface of the closely wound areas of the helix. If the entire helix were formed of closely wound convolutions its resistance to stretching would be very great and therefore the adjacent areas of closely wound convolutions are separated by sections of open convolutions which permit the helix to be stretched easily in order to accommodate the attaching devices to the spaced holes in the door or frame member.

While we have described and illustrated one embodiment of our invention, it will be understood by those skilled in the art that other embodiments, as well as modifications of that disclosed, may be made and practiced without departing in any way from the spirit or scope of the invention, for the limits of which reference must be made to the appended claims.

What is claimed is:

1. A sealer strip for attachment to a door or frame member or the like, comprising an elongated strip formed of resilient material such as rubber, an elongated wire helix embedded in said strip and extending substantially from end to end thereof, said helix having spaced along its length, alternate sections of substantially continuous cylindrical exterior surface and relatively high rigidity in which the convolutions are substantially abutting, and other alternate sections of relatively great flexibility in which the convolutions are relatively widely spaced, and a plurality of attaching devices each having a part at least partially surrounding one of said first sections of the helix and having another part extending outside the resilient strip and shaped for attachment within a hole in the door or frame member.

2. As a new article of manufacture, a device to be embedded in an elongated sealer strip formed of resilient material such as rubber for attaching the sealer strip to a door or frame member or the like, said device comprising an elongated wire helix having along its length alternate sections each having a substantially continuous exterior surface and relatively high rigidity and other sections of greater flexibility between said first sections, said first sections being formed by substantially abutting convolutions of the helix and said other sections being formed by widely spaced convolutions of the helix, and attaching devices spaced along the length of the helix and each having a part at least partially surrounding one of the first spaced sections of the helix and another part extending radially outwardly from the helix and being formed for insertion into a hole in the door or frame member or the like.

References Cited by the Examiner
UNITED STATES PATENTS

| 1,918,134 | 7/33 | Resch | 20—69 |
| 2,612,665 | 10/52 | Scott | 20—69 |
| 2,935,770 | 5/60 | Gagnier | 20—69 |

HARRISON R. MOSELEY, *Primary Examiner.*